A. DE CONINCK.
DETACHABLE WHEEL FOR VEHICLES.
APPLICATION FILED JAN. 2, 1912.
1,141,234.
Patented June 1, 1915.
2 SHEETS—SHEET 1.
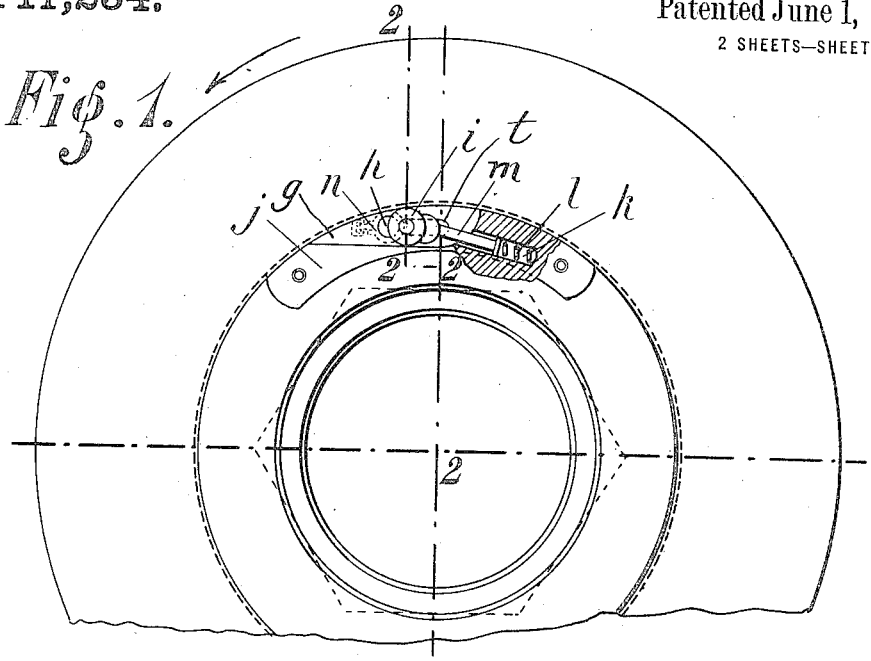
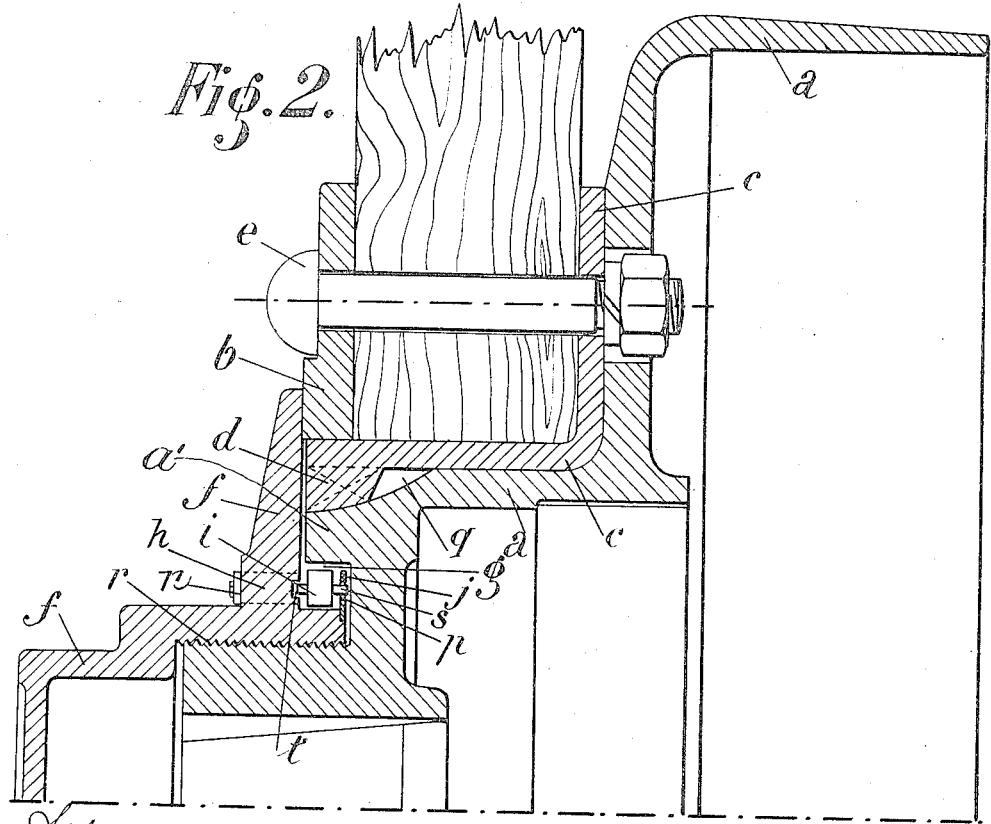

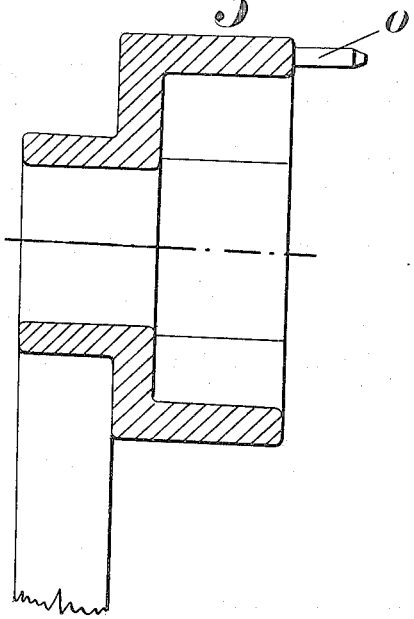
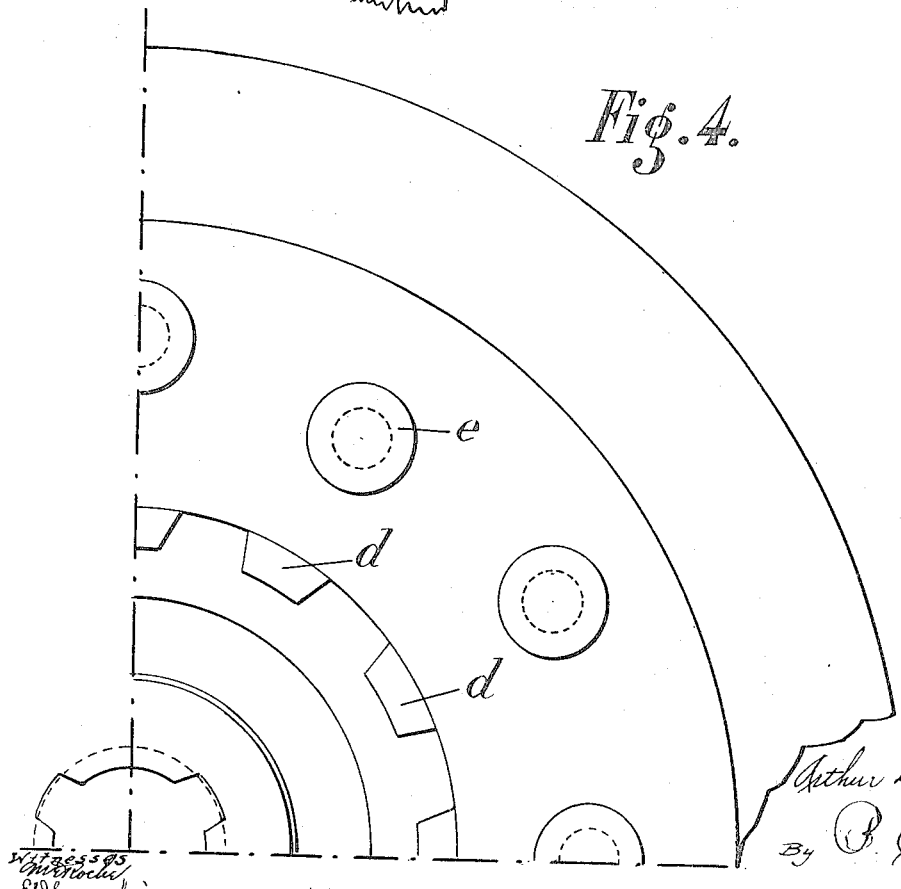

UNITED STATES PATENT OFFICE.

ARTHUR DE CONINCK, OF WOLUWE-ST.-LAMBERT, NEAR BRUSSELS, BELGIUM.

DETACHABLE WHEEL FOR VEHICLES.

1,141,234.	Specification of Letters Patent.	Patented June 1, 1915.

Application filed January 2, 1912. Serial No. 669,023.

*To all whom it may concern:*

Be it known that I, ARTHUR DE CONINCK, a subject of the King of Belgium, residing at 75 Avenue des Rogations, Woluwe-St.-Lambert, near Brussels, in the Kingdom of Belgium, have invented new and useful Improvements in or Relating to Detachable Wheels for Vehicles, of which the following is a specification.

This invention relates to a wheel which can be instantaneously detached simply by unscrewing a cap, and which is secured to the hub by the automatic locking of said cap, the unlocking of which is effected by means of a spanner for unscrewing said cap, which spanner is provided for such purpose with a special pin.

One embodiment of this invention is illustrated, merely by way of example, in the accompanying drawing, in which, Figure 1 shows the inner face of the detached cap partly in section. Fig. 2 is a vertical partial section of the wheel mounted and secured to the driving hub on line 2—2 of the cap shown in Fig. 1. Fig. 3 is a view of the head of the spanner used for unscrewing the cap and provided with a special pin for unlocking the same. Fig. 4 is an outside front elevation of the permanent hub, the cap of the said hub, and the detachable wheel being removed.

The whole device, as shown in Fig. 2, comprises the permanent hub *a*, a cheek or disk *b* and a flanged sleeve *c* inclosing between them the spokes of the wheel and forming the detachable part or driven hub, and a self-locking screw cap *f*.

The part *c* is provided with claws *d* engaging with grooves *g* made in the hub *a*. The part *c*, the disk *b* and the spokes of the wheel, are connected by means of bolts *e*.

A roller *i* is mounted in a recess *g* milled in the cap *f*. A driver *m* is operated by a spring *l* arranged within a hole *k* suitably arranged in the cap.

A plate *j* provided with a slot *p* keeps the roller *i* in position when the cap is removed. With this object the roller *i* is provided with a spindle *s* projecting on both sides and penetrating at one side into the slot *p* of the plate *j* and the other side into a groove *t* in the cap *f*, the groove *t* being parallel to the slot *p*.

A hole *h* is provided, for a purpose hereinafter to be described, and a pivoted cover *n* closes the hole *h* at the outside. After the wheel is slid on the hub, the cap is secured by means of a screw thread *r*, being turned in the direction of the arrow shown in Fig. 1. Once it is in place, owing to the tapered form of the recess *g*, it is impossible to remove the cap without having first introduced a pin into the hole *h*, whereby the roller *i* is held in the deepest portion of the recess and prevented from becoming jammed between the flange *a'* of the part *a* and the bottom of the recess *g* during the unscrewing of said cap.

If this operation would be neglected, the roller *i* driven by the driver *m* will have a tendency to engage with the shallowest portion of the recess when the cap is turned in the direction of unscrewing, and consequently a jamming or wedging takes place, and the cap is securely fixed.

Instead of a simple separate pin for disconnecting the wedging of the self-locking roller, it is preferable to provide the said pin *o* on the spanner for removing the cap of the hub, Fig. 4, so that the simple application of said spanner to the cap, brings about its unlocking and enables it to be freely tightened or loosened.

It is obvious that instead of the arrangement of the roller held in a tapered recess, the said roller may be replaced by a simple ball, a slide block or any other similar member controlled by an antagonistic spring and used as a wedging means between the cap and an inner cylindrical surface of the permanent hub.

For each wedging member the recess must be obviously made of a suitable shape, so as to enable the wedging part to slide under the action of the antagonistic spring in one direction, and under the action of the conical pin in the opposite direction.

I claim:

In a detachable wheel, in combination with a permanent, recessed hub provided with grooves and having a flange, a holder secured to said hub for holding the spokes of the wheel, claws upon said holder engaging said grooves, a cap adapted to be screwed onto said hub and provided with a tapering recess, a roller within the recess of said cap, a spring operated driver within a hole of said cap for normally pushing said roller into the shallowest portion of the tapering recess of said cap and jamming said roller between the flange of said hub and said cap for locking the latter against unscrewing, said roller being adapted to be pushed into the wider portion of said recess by a special tool adapted to be introduced through an opening of said cap for allowing an unscrewing of the same, substantially as described.

Dated this 15th December 1911.

In testimony whereof I affix my signature in presence of two witnesses.

ARTHUR DE CONINCK.

Witnesses:
  I. PARETTE,
  EMELE VONWANRELLI.